US007016874B2

(12) United States Patent
Rorimer

(10) Patent No.: US 7,016,874 B2
(45) Date of Patent: Mar. 21, 2006

(54) SYSTEM AND METHOD FOR HANDLING SECURITIES TRADING PLANS

(76) Inventor: Louis Rorimer, 17900 S. Park Blvd., Shaker Heights, OH (US) 44120

( * ) Notice: Subject to any disclaimer, the term of this patent is extended or adjusted under 35 U.S.C. 154(b) by 0 days.

(21) Appl. No.: 10/417,957

(22) Filed: Apr. 17, 2003

(65) Prior Publication Data

US 2004/0138987 A1   Jul. 15, 2004

Related U.S. Application Data

(60) Provisional application No. 60/439,656, filed on Jan. 13, 2003.

(51) Int. Cl.
*G06F 17/60* (2006.01)
(52) U.S. Cl. .......................... 705/37; 705/35
(58) Field of Classification Search .................. 705/36, 705/37
See application file for complete search history.

(56) References Cited

U.S. PATENT DOCUMENTS

| | | | | |
|---|---|---|---|---|
| 5,038,284 | A * | 8/1991 | Kramer ........................ | 705/37 |
| 6,796,489 | B1 * | 9/2004 | Slater et al. ................. | 235/379 |
| 2003/0078865 | A1 * | 4/2003 | Lee ............................. | 705/35 |
| 2003/0154149 | A1 * | 8/2003 | Gajendragadkar ........... | 705/36 |
| 2003/0204461 | A1 * | 10/2003 | Magary et al. ............... | 705/36 |
| 2004/0193532 | A1 * | 9/2004 | Lawrence .................... | 705/37 |
| 2005/0055302 | A1 * | 3/2005 | Wenger et al. ............... | 705/36 |
| 2005/0091134 | A1 * | 4/2005 | Rossides ...................... | 705/35 |
| 2005/0149427 | A1 * | 7/2005 | Meehan et al. .............. | 705/37 |
| 2005/0240506 | A1 * | 10/2005 | Koenig ......................... | 705/37 |

FOREIGN PATENT DOCUMENTS

JP       02004287819 A  * 10/2004

WO       WO 03/038568 A2 *  5/2003

OTHER PUBLICATIONS

Jagolinzer, A D, An Empirical Ananlsis of Insider Trader Behavior Within Rule 10b5-1, May 7, 2004, 44 pages.*
Mintz Levin online publication, Rule 10b5-1 Trading Plans: Common Questions and Practical Guidance, Oct. 2001, 4 page.*
Grant D and Diver J, SEC Rule 10b5-1: Allowing Corporate Insiders More Opportunities to Sell Corporate Stock, Journal of Financial Planning, May 2001, 3 pages.*
Hogoboom, J., Skolnick S., SEC Adopts Regulation FD to Combat Selective Disclosure of Material Non-Public Information to Market Professionals, Lowenstein Adler PC Alert, Sep. 2000, 8 pages.*

(Continued)

*Primary Examiner*—Charles R. Kyle
(74) *Attorney, Agent, or Firm*—Jones Day

(57) ABSTRACT

A system for handling securities trading plans includes a securities trading plan template, a storage mechanism, and a plan verifier. The securities trading plan template is to be accessed by a person associated with the organizational entity to generate a completed securities trading plan that identifies conditions under which a securities-related transaction is to occur. The plan verifier receives the completed securities trading plan and records the completed securities trading plan in the storage mechanism so that the completed securities trading plan may be used as a defense in a securities-related legal proceeding involving the person associated with the organizational entity. The securities trading plan is completed by the person associated with the organizational entity at a time when the person is not aware of material, non-public information relating to the organizational entity in order to minimize exposure to liability under federal securities laws in the event that the person becomes aware of such material, non-public information after the completed securities trading plan has been recorded by the plan verifier.

34 Claims, 13 Drawing Sheets

OTHER PUBLICATIONS

Hecht, S. SEC Casts Wider Net with New Insider Trading Rules, Lowenstein Adler PC Alert, Dec. 2000, 6 pages.*

Restrictions on Trading of Securities While in Posession of Material Non-Public Information, Winston and Strawn Securities Briefing, May 17, 2000, 3 apges.*

Text of Supreme Court decision of Oct. , 1987 term in case of Basic Inc. et al. v. Levinson et al.*

Securities Exchange Act of 1934, Sec. 10, Bulletin No. 207, p. 757 (Oct. 15, 2002.

Exchange Act Rules, Manipulative and Deceptive Devices and Contrivances, Rule 10b-1, Bulletin No. 209, pp. 1082-1084 (Feb. 15, 2003).

Rule 10b5-1, http://www.realcorporatelaw.com/10b5-1FAQ.htmnl, 17 pgs.

Section16.net Presents . . . "Comparing the Section 16 Filers" What You Need to Know Now, http://www.section16.net/member/Webcast/04_08_03transcript.html, 21 pgs.

Maremont, Mark, "In Corporate Crimes, Paper Trail Often Leads to Ink Analysts' Door", 3 pgs. (2003).

Zuckerman, Gregory, "Insider Selling Surges: Normal Market Jitters or Reliable Indicator?", Wall Street Journal, 2 pgs. (Jun. 4, 2003).

PCT International Search Report dated Jan. 31, 2005 (3 pgs.).

PCT Written Opinion dated Jan. 31, 2005 (3 pgs.).

* cited by examiner

FIGURE 10

TEMPLATE FOR INDEPENDENT SALES PLAN (ISP) FOR COMMON STOCK OF XYZ COMPANY (OWNED SHARES)

TO CREATE AN ISP TO SELL SHARES OF XYZ COMMON STOCK YOU PRESENTLY OWN, PLEASE READ THE GENERAL INSTRUCTIONS AND THEN ANSWER THE FOLLOWING QUESTIONS:

1. NAME: _____

2. ARE YOU AWARE OF ANY MATERIAL NONPUBLIC INFORMATION ("INSIDE INFORMATION") ABOUT COMPANY XYZ?

YES ___  NO ___

3. HOW MUCH STOCK DO YOU OWN NOW THAT YOU COULD SELL?

_____ SHARES OF COMMON STOCK

4. HOW MUCH STOCK DO YOU WANT TO SELL ON EACH SALE DATE?

_____ SHARES OF COMMON STOCK
   OR
   $ _____ WORTH OF COMMON STOCK
   (GROSS PROCEEDS OF SALE)

5. WHAT IS THE LOWEST PRICE PER SHARE AT WHICH YOU WILL SELL?

$ _____ PER SHARE

6. WHEN DO YOU WANT TO MAKE YOUR FIRST SALE?

_____ (DATE)

7. OVER WHAT PERIOD OF TIME DO YOU WANT TO SELL?

___ 6 MONTHS
   ___ 12 MONTHS
   ___ 18 MONTHS
   ___ 24 MONTHS
   ___ 36 MONTHS

8. HOW OFTEN DO YOU WANT TO SELL?

___ WEEKLY
   ___ MONTHLY
   ___ QUARTERLY

9. ON WHAT DAY OF THE WEEK/MONTH/QUARTER DO YOU WANT TO SELL?

_____ (FILL IN A NUMBER FROM 1 TO 92)

10. HERE IS A CALENDAR FOR THE PERIOD COVERED BY YOUR ISP SHOWING THE SCHEDULED SALES DATES. (IF THE CHOICES FALL ON A WEEKEND OR OTHER DAY WHEN THE EXCHANGES ARE CLOSED, THE CALENDAR SHOWS THE NEXT TRADING DAY.) CLICK ON A SALES DAY TO VIEW THE NUMBER OF SHARES TO BE SOLD.

11. THE GENERAL INSTRUCTIONS CONTAIN IMPORTANT INFORMATION ABOUT YOUR ISP. BEFORE SUBMITTING YOUR ISP, PLEASE CONFIRM THAT YOU HAVE READ AND UNDERSTOOD THEM BY CLICKING BELOW.

___ I UNDERSTAND THE GENERAL INSTRUCTIONS

12. IF YOU ARE SATISFIED WITH YOUR ISP, THEN CLICK ON "SUBMIT" BELOW. YOUR ISP WILL BE EFFECTIVE AS SOON AS IT IS APPROVED BY THE PLAN ADMINISTRATOR.

[SUBMIT]

FIGURE 11A

TEMPLATE FOR INDEPENDENT SALES PLAN (ISP) FOR
COMMON STOCK OF XYZ COMPANY (OPTION SHARES)

TO CREATE AN ISP TO SELL SHARES OF XYZ COMMON STOCK YOU PLAN TO ACQUIRE BY EXERCISING STOCK OPTIONS, PLEASE READ THE GENERAL INSTRUCTIONS AND THEN ANSWER THE FOLLOWING QUESTIONS:

1. NAME: _____

2. ARE YOU AWARE OF ANY MATERIAL NONPUBLIC INFORMATION ("INSIDE INFORMATION") ABOUT COMPANY XYZ?

YES ____  NO ____

3. LIST THE OPTIONS YOU PLAN TO EXERCISE BELOW:

| GRANT DATE | NO. OF SHARES SUBJECT TO OPTION | EXERCISE PRICE | VESTING DATE | EXPIRATION DATE |
|---|---|---|---|---|
| | | | | |
| | | | | |
| | | | | |
| | | | | |
| | | | | |

4. DO YOU WANT TO SELL ALL OF THE SHARES YOU ACQUIRE UPON EXERCISE, OR JUST ENOUGH TO COVER THE EXERCISE PRICE?

____ ALL   ____ JUST ENOUGH

5. HOW MANY OPTIONS DO YOU WANT TO EXERCISE ON EACH SALE DATE?

OPTIONS FOR _____ SHARES OF STOCK.
OR
OPTIONS FOR _____ WORTH OF COMMON STOCK
(GROSS PROCEEDS)

6. WHAT IS THE LOWEST PREVAILING MARKET PRICE PER SHARE AT WHICH YOU WILL EXERCISE?

$ _____ PER SHARE

7. WHEN DO YOU WANT TO COMMENCE YOUR FIRST EXERCISE AND SALE?

_____ (DATE)

8. OVER WHAT PERIOD OF TIME DO YOU WANT TO SELL?

____ 6 MONTHS
____ 12 MONTHS
____ 18 MONTHS
____ 24 MONTHS
____ 36 MONTHS

9. HOW OFTEN DO YOU WANT TO SELL?

____ WEEKLY
____ MONTHLY
____ QUARTERLY

10. ON WHAT DAY OF THE WEEK/MONTH/ QUARTER DO YOU WANT TO SELL?

_____ (FILL IN A NUMBER FROM 1 TO 92)

FIGURE 11B

11. HERE IS A CALENDAR FOR THE PERIOD COVERED BY YOUR ISP SHOWING THE SCHEDULED SALES DATES. (IF THE CHOICES FALL ON A WEEKEND OR OTHER DAY WHEN THE EXCHANGES ARE CLOSED, THE CALENDAR SHOWS THE NEXT TRADING DAY.) CLICK ON A SALES DAY TO VIEW THE NUMBER OF SHARES TO BE SOLD.

12. THE GENERAL INSTRUCTIONS CONTAIN IMPORTANT INFORMATION ABOUT YOUR ISP. BEFORE SUBMITTING YOUR ISP, PLEASE CONFIRM THAT YOU HAVE READ AND UNDERSTOOD THEM BY CLICKING BELOW.

___ I UNDERSTAND THE GENERAL INSTRUCTIONS

13. IF YOU ARE SATISFIED WITH YOUR ISP, THEN CLICK ON "SUBMIT" BELOW. YOUR ISP WILL BE EFFECTIVE AS SOON AS IT IS APPROVED BY THE PLAN ADMINISTRATOR.

SUBMIT

SYSTEM AND METHOD FOR HANDLING SECURITIES TRADING PLANS

CROSS-REFERENCE TO RELATED APPLICATION

This application claims priority from and is related to the following prior application: "Brokerless Diversification Plan," U.S. Provisional Application No. 60/439,656, filed Jan. 13, 2003. This prior application, including the entire written description and drawing figures, is hereby incorporated into the present application by reference.

FIELD

The present application relates generally to the field of securities trading plans. More particularly, the application describes a system and method for handling securities trading plans that minimizes exposure to liability under federal securities laws.

BACKGROUND

Many publicly traded companies provide their employees with opportunities to acquire stock in the employer corporation on favorable terms. However, employees often encounter a number a obstacles when they are ready to sell their stock to diversify their portfolios. For example, these obstacles may include (1) exposure to potential liability for trading on inside information, (2) negative market perception about their reasons for selling, and (3) employer stock ownership guidelines, which are used by many companies to encourage employees to hold company stock for the long term.

Recent years have seen the development of a practice that has partially addressed one of these obstacles. Rule 10b5-1 under the Securities Exchange Act of 1934, which became effective on Oct. 23, 2000, now provides that a seller of securities will not be liable for trading on inside information if the sale was initiated under the proper circumstances at a time when the seller did not possess material, nonpublic information about the issuer of the securities. As a result of this new rule, it has become possible for an employee to enter into an agreement with a broker to sell company stock over a period of time without exposure to risk of liability for insider trading. Many of these pre-planned sale programs incorporate the scheduled exercise of an employee stock option through the broker, followed by the immediate sale of the shares acquired upon exercise of the option.

Conventional pre-planned sale programs sponsored by brokers represent an advance over earlier unplanned sales, but suffer from a number of disadvantages. First, each broker typically has its own form documents, which must be reviewed and revised to meet the desires of the employee and the requirements of the issuer and its counsel. This is often a time-consuming and inefficient process. Second, most brokers charge premium fees for the additional services required to implement these plans. These fees are typically born by employees and reduce the benefits they receive from participating in stock ownership programs. Third, the need for the involvement of a pre-selected broker with these conventional plans limits the choice of brokers for the duration of the agreement, which can extend over a period of years. This lack of flexibility is a deterrent to the use of these plans. In addition, the role of the employer in selecting a broker to execute the exercise of stock options as part of such a plan could be considered to constitute prohibited "arranging" for an extension of credit under Section 13(k) of the Securities Exchange Act.

SUMMARY

A system for handling securities trading plans includes a securities trading plan template, a storage mechanism, and a plan verifier. The securities trading plan template is to be accessed by a person associated with the organizational entity to generate a completed securities trading plan that identifies conditions under which a securities-related transaction is to occur. The plan verifier receives the completed securities trading plan and records the completed securities trading plan in the storage mechanism so that the completed securities trading plan may be used as a defense in a securities-related legal proceeding involving the person associated with the organizational entity. The securities trading plan is completed by the person associated with the organizational entity at a time when the person is not aware of any material, non-public information relating to the organizational entity in order to minimize exposure to liability under federal securities laws in the event that the person becomes aware of such material, non-public information after the completed securities trading plan has been recorded by the plan verifier.

BRIEF DESCRIPTION OF THE DRAWINGS

FIG. 10 shows an example trading plan template for the sale of owned shares of common stock;

FIGS. 11A and 11B show an example trading plan template for the sale of option shares of common stock.

DETAILED DESCRIPTION

Figure 1:
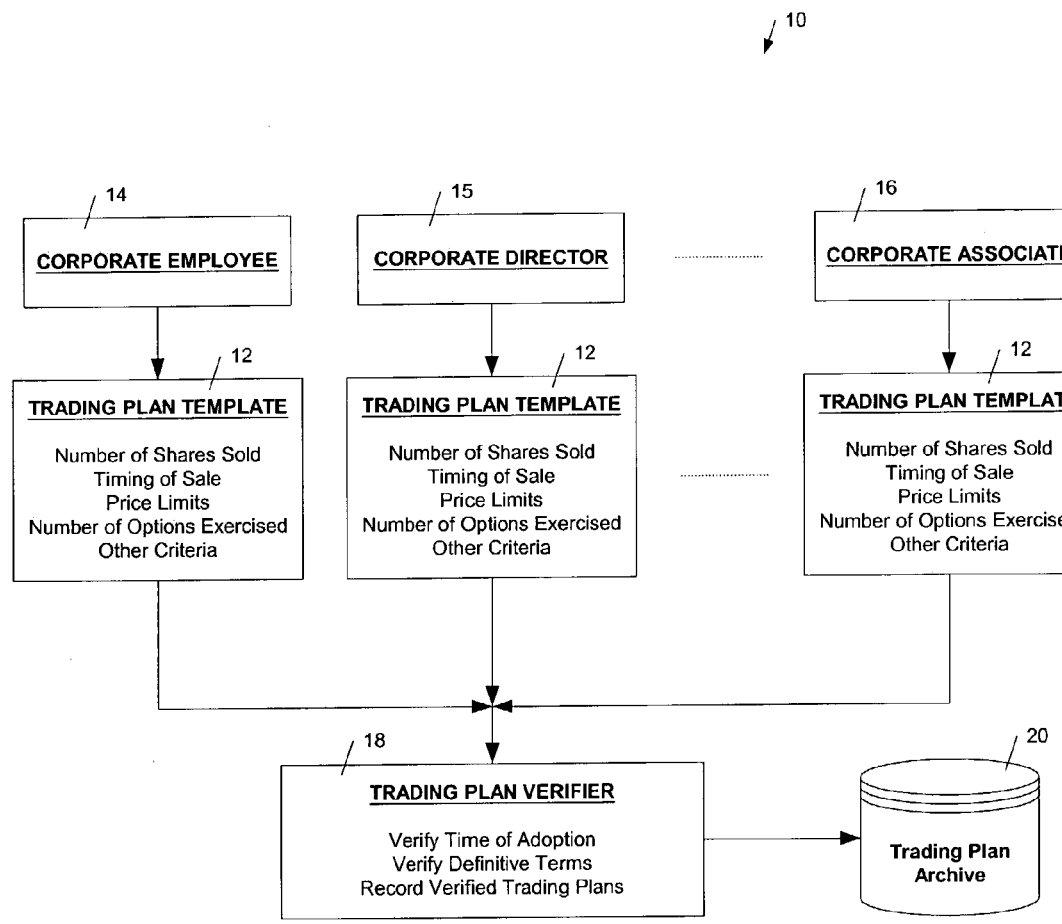
FIG. 1 is a block diagram of an example system for handling securities trading plans.

With reference now to the drawing figures, FIG. 1 is a block diagram of an example system 10 for handling securities trading plans within an organizational entity, such as a corporation. The system includes a trading plan template 12 that may be accessed by one or more persons 14–16 associated with the organizational entity, a trading plan verifier 18, and a storage mechanism 20. As illustrated, the trading plan template may be accessed by employees, directors, or other persons associated with the organizational entity (collectively referred to herein as "corporate associates").

The trading plan template 12 may, for example, be an electronic document that can be accessed and completed by a corporate associate 14–16 using an electronic medium, but could also be another type of document, such as a paper document. The trading plan template 12 may be completed by a corporate associate 14–16 to generate a completed securities trading plan that identifies certain conditions under which one or more securities-related transactions are to occur. The trading plan template 12 should be completed by the corporate associate 14–16 at a time when she is not aware of any material nonpublic information ("inside information") relating to the organizational entity. (See, FIG. 2.) In addition, the completed securities plan should include at least sufficient detail of the securities-related transaction(s) as required under the applicable federal securities laws. For example, to comply with Rule 10b5-1 of the Securities Exchange Act of 1934 ("Rule 10b5-1), the completed securities plan should include either 1) the amount of securities to be purchased or sold and the price at which and the date on which the securities are to be purchased or sold, or 2) a means, such as a written formula, algorithm or computer program, for determining the amount of securities to be purchased or sold and the price at which and the date on which the securities are to be purchased or sold. As illustrated in FIG. 1, the information included in the completed securities plan might, for example, include the number of shares of securities to be sold, the timing of the sale, price limits for the sale, the number of securities options to be exercised, or some other relevant criteria.

Once a trading plan template 12 has been completed by a corporate associate 14–16, the resultant securities trading plan is submitted to the trading plan verifier 18, which records the completed plan in the storage mechanism 20 so that it may be used as a defense in a subsequent securities-related lawsuit involving the corporate associate 14–16. The trading plan verifier 18 may, for example, be implemented as a software application or in a different arrangement, such as a paper-based business process. In the case of a software application, the trading plan verifier 18 may, for example, verify the plan by recording the completed plan and the time of its adoption in an electronic trading plan archive 20, such as an electronic database. In the case of a paper-based system, for example, the trading plan verifier 18 may be an employee of the organizational entity or a third-party service provider that records the time of adoption on the plan and files the verified plan in a physical trading plan archive 20, such as a filing cabinet.

In one embodiment, the trading plan verifier 18 provides a means for third party verification of the terms of the completed trading plan. In the case of a software-based system, for example, the completed trading plan may be electronically submitted to a trading plan verifier 18 operated by an independent third-party service provider for verification. For instance, the third-party service provider may be obligated to the organizational entity to testify in court regarding pertinent details of the recorded plan in the event of a securities-related lawsuit.

Figure 2:
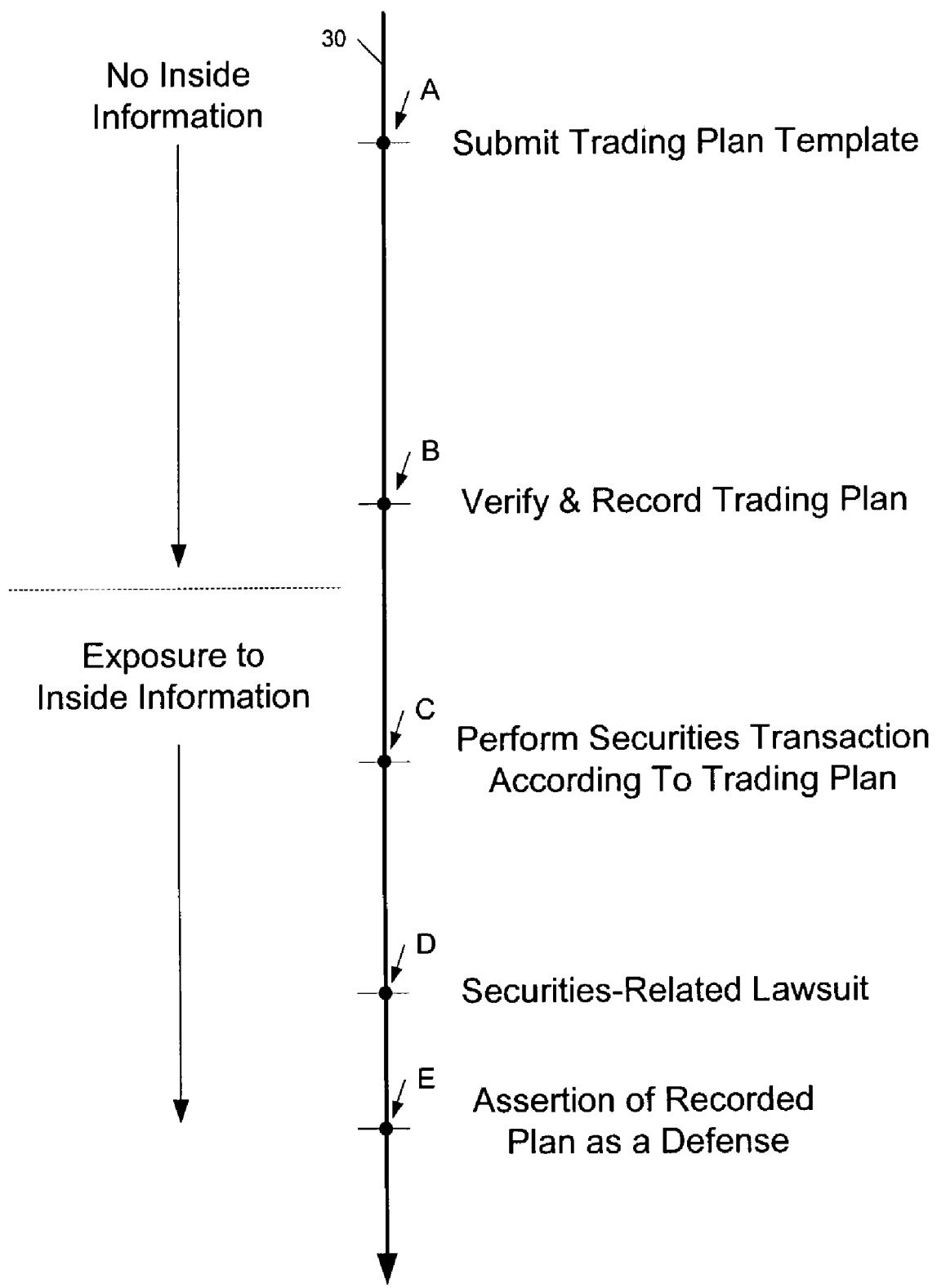
FIG. 2 is a timeline that helps to illustrate the protection afforded a corporate associate by properly implementing a securities trading plan using the system described in FIG. 1.

FIG. 2 shows a timeline 30 that helps to illustrate the protection afforded a corporate associate 14–16 by properly implementing a securities trading plan using the system 10 described in FIG. 1. The passage of time is illustrated on the timeline 30 in the direction of the arrow. At point A on the timeline 30, a trading plan template 12 is completed by a corporate associate 14–16, detailing one or more proposed securities-related transactions. The completed plan is then verified and recorded at point B on the timeline 30, as described above.

Until the time when the plan is verified and recorded at point B, the corporate associate 14–16 is not aware of any inside information relating to the organizational entity. Some time after the plan has been recorded (B), however, the corporate associate 14–16 may become aware of insider information. The securities transaction is then implemented at point C on the timeline 30, in accordance with the conditions set forth in the recorded and verified trading plan. Provided that the recorded and verified trading plan includes all of the information required under the applicable federal securities laws, such as Rule 10b5-1, the corporate associate may avoid liability in a subsequent insider trading lawsuit (point D), even though the actual sale took place when the corporate associate was aware of inside information, by asserting the recording trading plan as a defense (point E).

Figure 3:
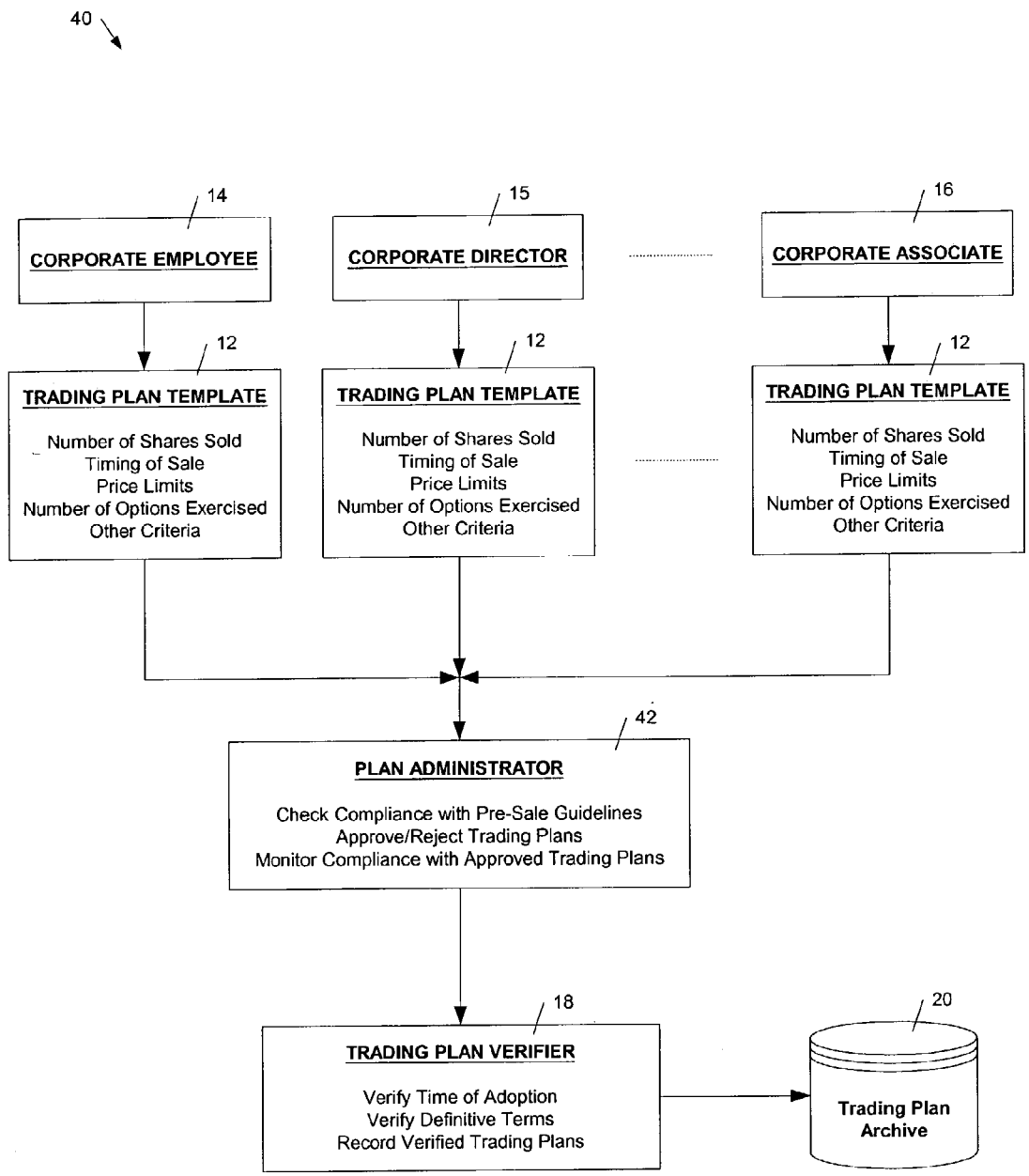
FIG. 3 is a block diagram illustrating another example embodiment of a system for handling securities trading plans.

FIG. 3 is a block diagram illustrating another example embodiment of a system 40 for handling securities trading plans. This system 40 is similar to the system 10 described above with reference to FIG. 1, with the addition of a plan administrator 42. The plan administrator 42 may, for example, be a corporate employee or representative, such as a corporate attorney, who ensures that completed securities trading plans comply with a set of securities ownership guidelines 44 before approving the trading plans. In other embodiments, however, the plan administrator 42 may be a software application or some other automated mechanism for checking completed securities plans against the securities ownership guidelines 44. The securities ownership guidelines 44 may be a standardized set of conditions that must be satisfied before a corporate associate is authorized to make a securities-related transaction, and could include, for example, company stock ownership guidelines. The securities ownership guidelines 44 may be recorded in an electronic format, in a paper-based format, or in some other suitable medium.

In the illustrated embodiment, the plan administrator 42 approves each completed trading plan under the securities ownership guidelines before the plan is verified and recorded by the trading plan verifier 18. Trading plans that are not approved by the plan administrator 42 are not recorded by the trading plan verifier in this embodiment. In addition, once a trading plan is approved and recorded, the plan administrator 42 may monitor the plan to ensure that all of the securities-related transactions detailed in the trading plan are carried out in accordance with the plan. The safe harbor provisions of Rule 10b5-1 only apply to securities-related transactions carried out in compliance with the trading plan. That is, the approved and recorded trading plan loses its effect if the transaction(s) are not carried out as detailed in the trading plan. Thus, the monitoring function of the plan administrator 42 may be used to ensure that securities-related transactions are carried out in accordance with the recorded trading plans. If a transaction is not carried out in accordance with a recorded trading plan, then the plan administrator 42 may, for example, instruct the trading plan verifier 18 to remove the trading plan from the trading plan archive 20 and inform the corporate associate 14–16 that the plan is no longer in effect.

Figure 4:
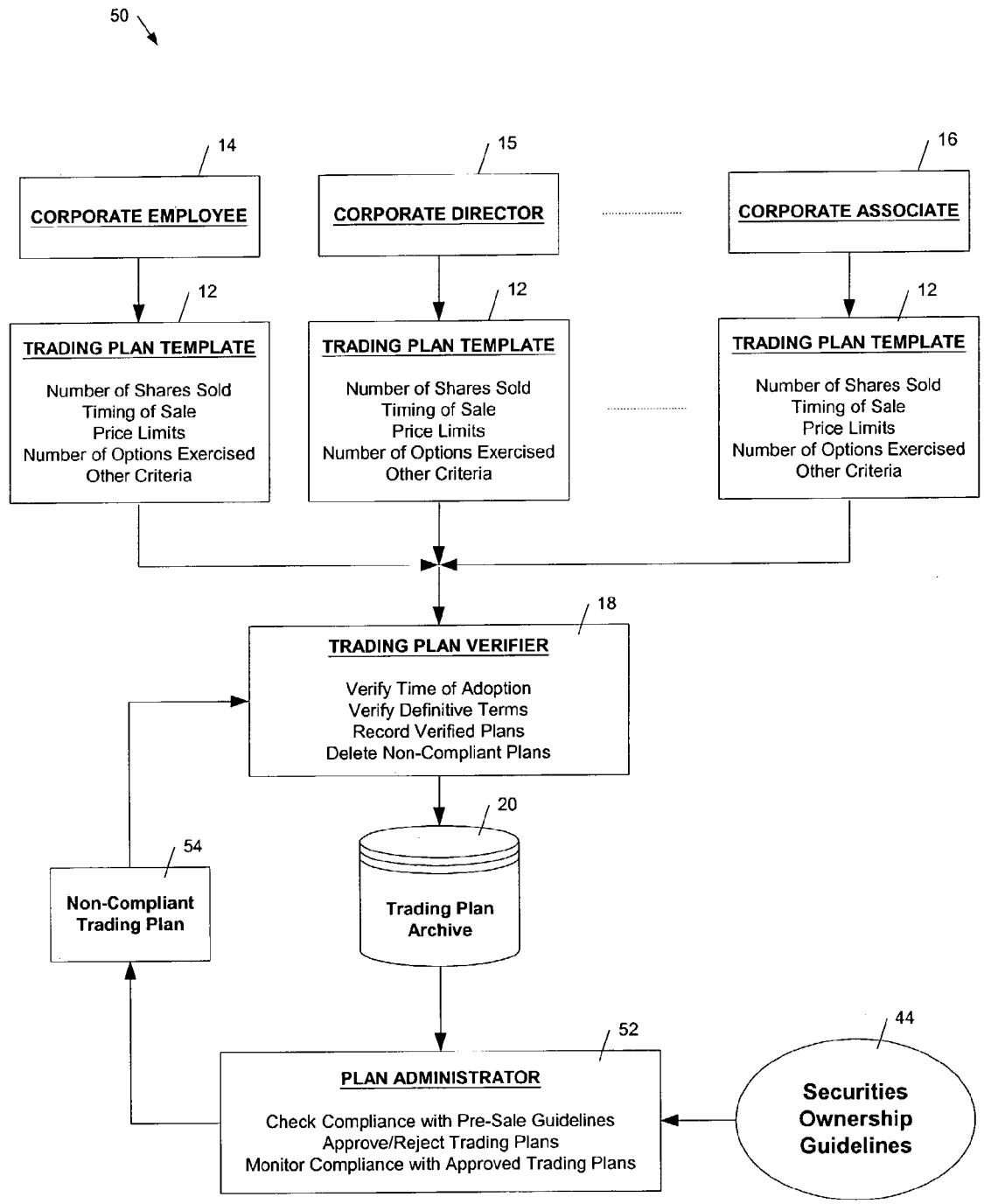
FIG. 4 is a block diagram illustrating one alternative system for handling securities trading plans.

FIG. 4 is a block diagram illustrating one alternative system 50 for handling securities trading plans. This embodiment 50 is similar to the system 40 described above with reference to FIG. 3, except that the plan administrator 52 in this embodiment 50 does not review a completed trading plan until after the plan has been verified and recorded in the trading plan archive 20 by the trading plan verifier 18. This configuration 50 may, for example, enable trading plans to be recorded earlier than the embodiment 40 of FIG. 3, and may allow the plan administrator 52 more time to complete its review for compliance with the securities ownership guidelines 20. If, upon completing its review, the plan administrator 52 determines that a trading plan recorded in the plan archive 20 is not in compliance with the securities ownership guidelines 20, then the plan administrator 52 notifies the trading plan verifier 18 of the non-compliant trading plan 54. The trading plan verifier 18 may then remove the non-compliant plan 54 from the trading plan archive 20. The plan administrator 52 may also notify the appropriate corporate associate 14–16 of the non-compliant plan 54, monitor compliance of approved trading plans, and perform other related administrative functions.

Figure 5:
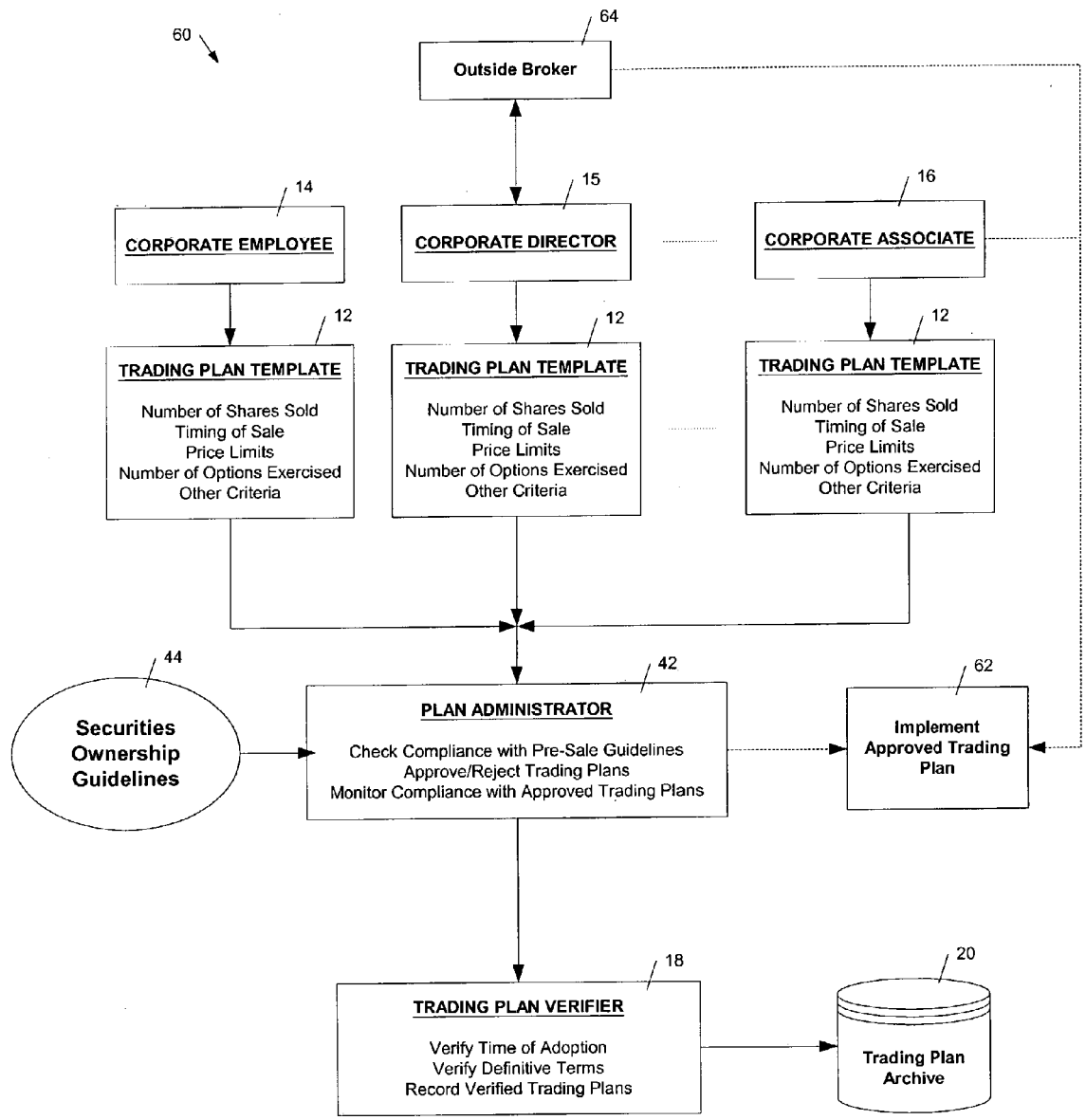
FIG. 5 is a block diagram of the system of FIG. 3, illustrating three example methods by which an approved securities trading plan may be implemented.

FIG. 5 is a block diagram 60 of the system 40 of FIG. 3, illustrating three example methods by which an approved securities trading plan may be implemented 62. These three situations are illustrated in FIG. 5 by the dotted arrows leading to block 62, entitled "Implement Approved Trading Plan." In one case, the plan administrator 42 may be responsible for implementing 62 securities-related transactions in accordance with one or more of the approved trading plans recorded in the trading plan archive 20. In other cases, the securities-related transaction(s) detailed in a recorded trading plan may be implemented 62 by the corporate associate 16 herself, or by a securities broker 64 acting on behalf of a corporate associate 15. If the plan administrator 42 is not ultimately responsible for carrying out the transaction(s) in accordance with an approved securities trading plan, however, then the plan administrator 42 should preferably make the corporate associate 15, 16 aware of the potential legal consequences for failing to comply with the approved and recorded plan. The plan administrator 42 may also monitor the transactions made by a corporate associate 15, 16 or her representative 46 to ensure the continued viability of the verified trading plans recorded in the trading plan archive 20.

Figure 6:
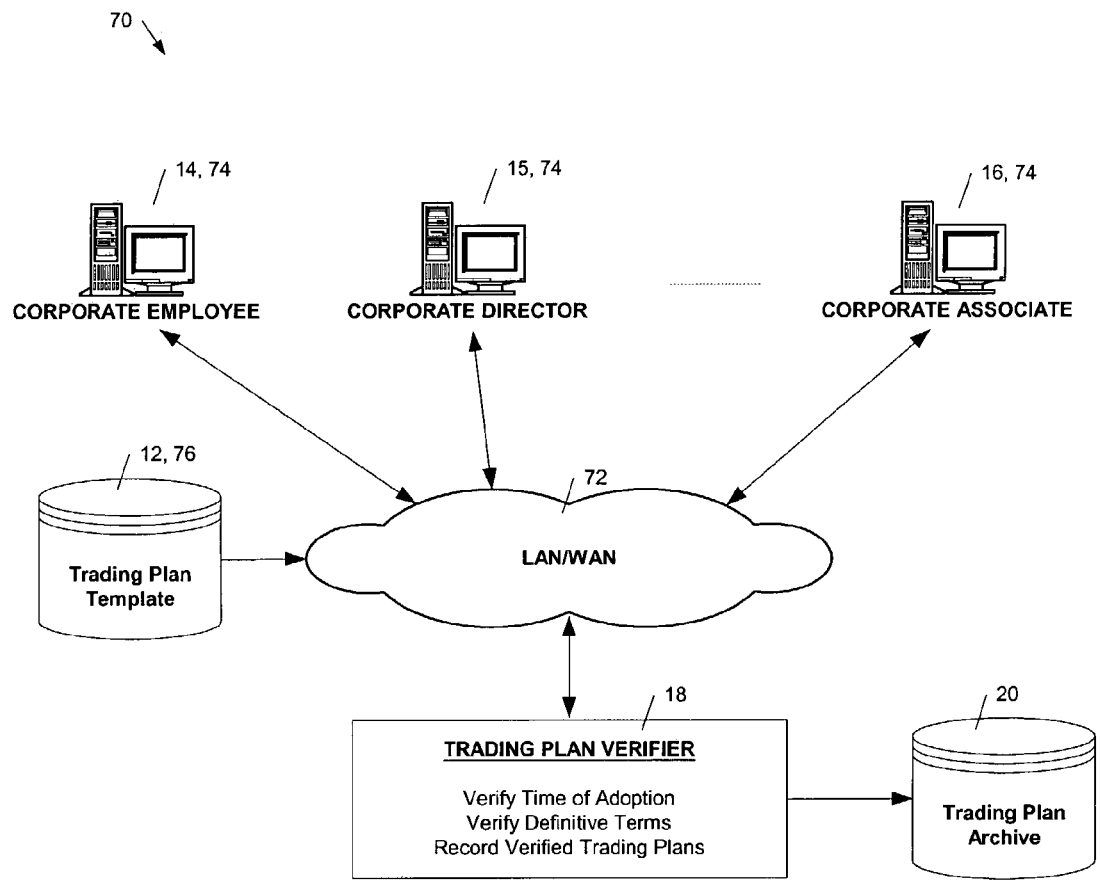
FIG. 6 is a block diagram illustrating one example configuration for implementing the system of FIG. 1 in a computer network environment.

FIG. 6 is a block diagram illustrating one example configuration 70 for implementing the system 10 of FIG. 1 in a computer network environment. In this embodiment 70, the corporate associates 14–16 may access the trading plan template 12 through a computer network 72 using a computer 74, such as a personal computer or network terminal. The trading plan template 12 is an electronic document stored in a memory device 76, such as a network database, and is preferably accessible by the computers 74 through a secure corporate local area network (LAN) 72.

Upon completion by a corporate associate 14–16, the trading plan is transmitted from a computer 74 to the trading plan verifier 18 via the computer network 72. The trading plan verifier 18 verifies the time of adoption and definitive terms of the completed trading plan, and stores the verified plan to the trading plan archive 20, as described above. If the trading plan verifier 18 and trading plan archive 20 are maintained within the organizational entity, then the completed trading plan is preferably transmitted from a computer 74 to the trading plan verifier 18 via a secure corporate LAN 72. If the trading plan verifier 18 is maintained by a third party service provider, however, then the completed trading plan may be transmitted to the trading plan verifier over a non-secure wide area network (WAN) 72, such as the Internet.

Figure 7:
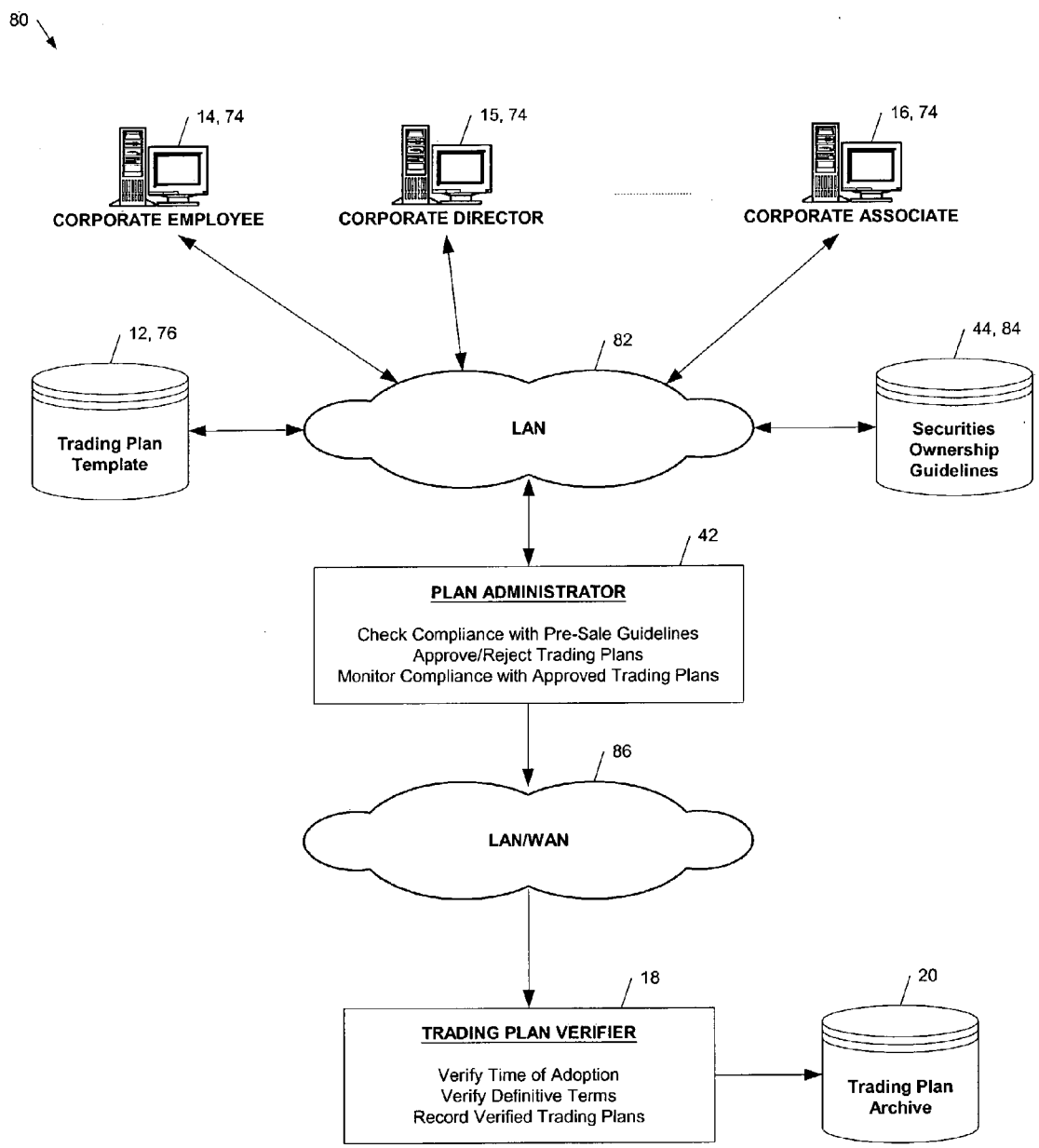
FIG. 7 is a block diagram illustrating one example configuration for implementing the system of FIG. 3 in a computer network environment.

FIG. 7 is a block diagram illustrating one example configuration 80 for implementing the system 40 of FIG. 3 in a computer network environment. Similar to the network configuration 70 shown in FIG. 6, the corporate associates 14–16 in this embodiment 80 may use a computer 74 to access and complete a trading plan template 12 via a computer network, such as a corporate LAN 82. A completed trading plan may then be transmitted through the corporate LAN 82 to the plan administrator 42 for approval in accordance with the securities ownership guidelines 44. The trading plan template 12 and securities ownership guidelines 44 may be electronic documents stored in one or more memory devices 76, 84 coupled to the corporate LAN 82. In other embodiments, however, the securities ownership guidelines 44 could be recorded in a paper-based format or in some other suitable medium that is accessible by the plan administrator 42.

Once a trading plan has been approved by the plan administrator 42, the approved plan is transmitted to the trading plan verifier 18 via a computer network 86. The trading plan verifier 18 verifies the approved plan and records the verified plan in the trading plan archive 20, as described above. The computer network 86 may be a secure corporate LAN if the trading plan verifier 18 is maintained within the organizational entity, or could be a non-secure WAN if the trading plan verifier 18 is maintained by a third party service provider.

Figure 8:
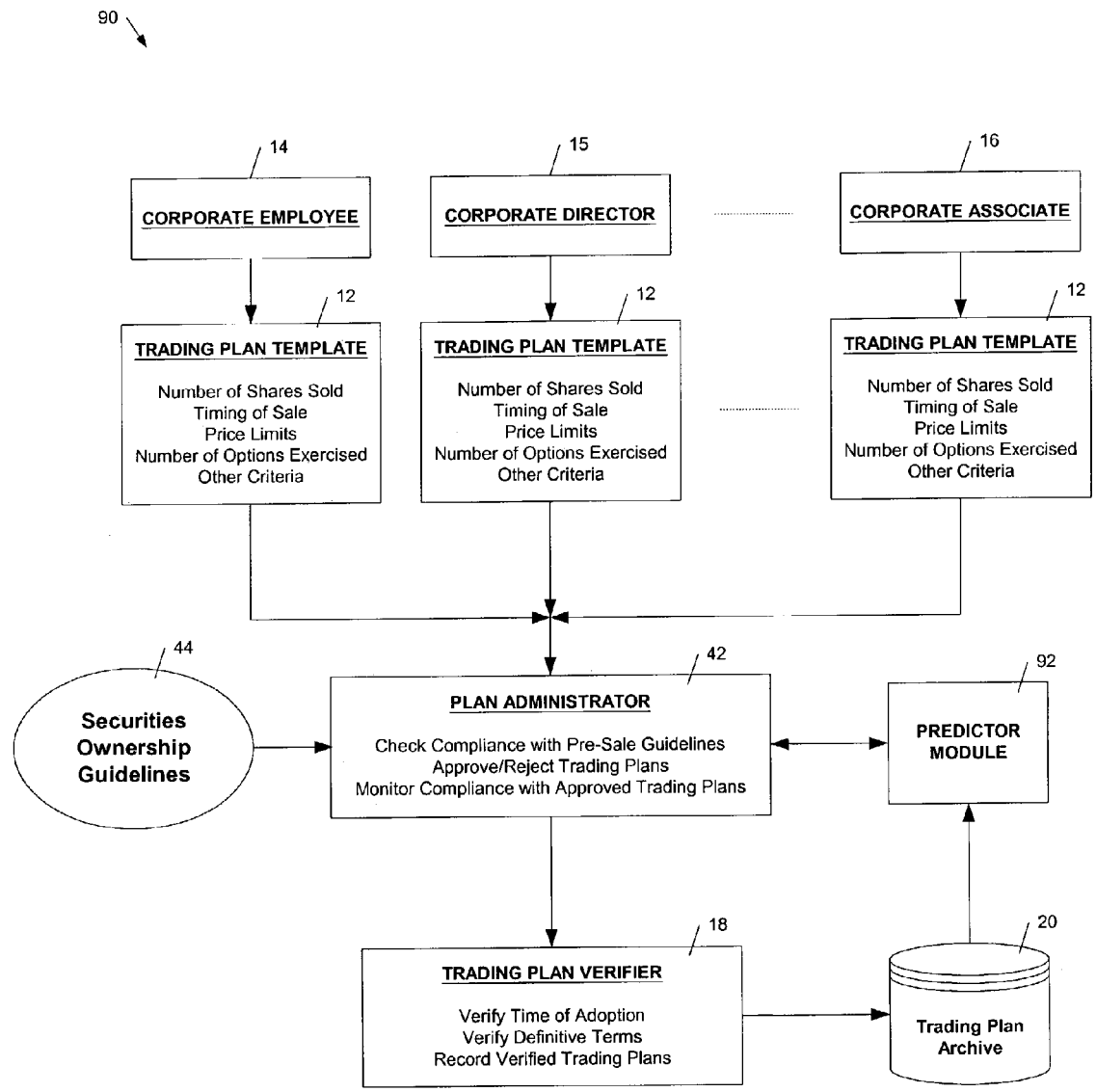
FIG. 8 is a block diagram illustrating an example system for predicting the impact of recorded securities trading plans.

FIG. 8 is a block diagram illustrating an example system 90 for predicting the impact of recorded securities trading plans. This embodiment 90 is similar to the system 40 of FIG. 3, with the addition of a predictor module 92 that monitors the verified securities trading plans recorded in the trading plan archive 20. It should be understood, however, that the predictor module 92 could also be used with other embodiments, such as those illustrated in FIGS. 1, 4, 5, 6, 7, and 9. The predictor module 92 may, for example, be configured by the plan administrator 42 or by some other corporate associate to perform selected statistical analyses based on the projected security transactions detailed in the recorded securities trading plans. For instance, the predictor module 92 may analyze the planned sales set forth in the recorded trading plans (of one or more people) to predict the impact of the projected sales on the future market value for the relevant securities. The predictor module 92 could also analyze the planned sales detailed in the recorded trading plans to predict other potential results, such as the percent stock ownership by employees at a given point in time.

Figure 9:
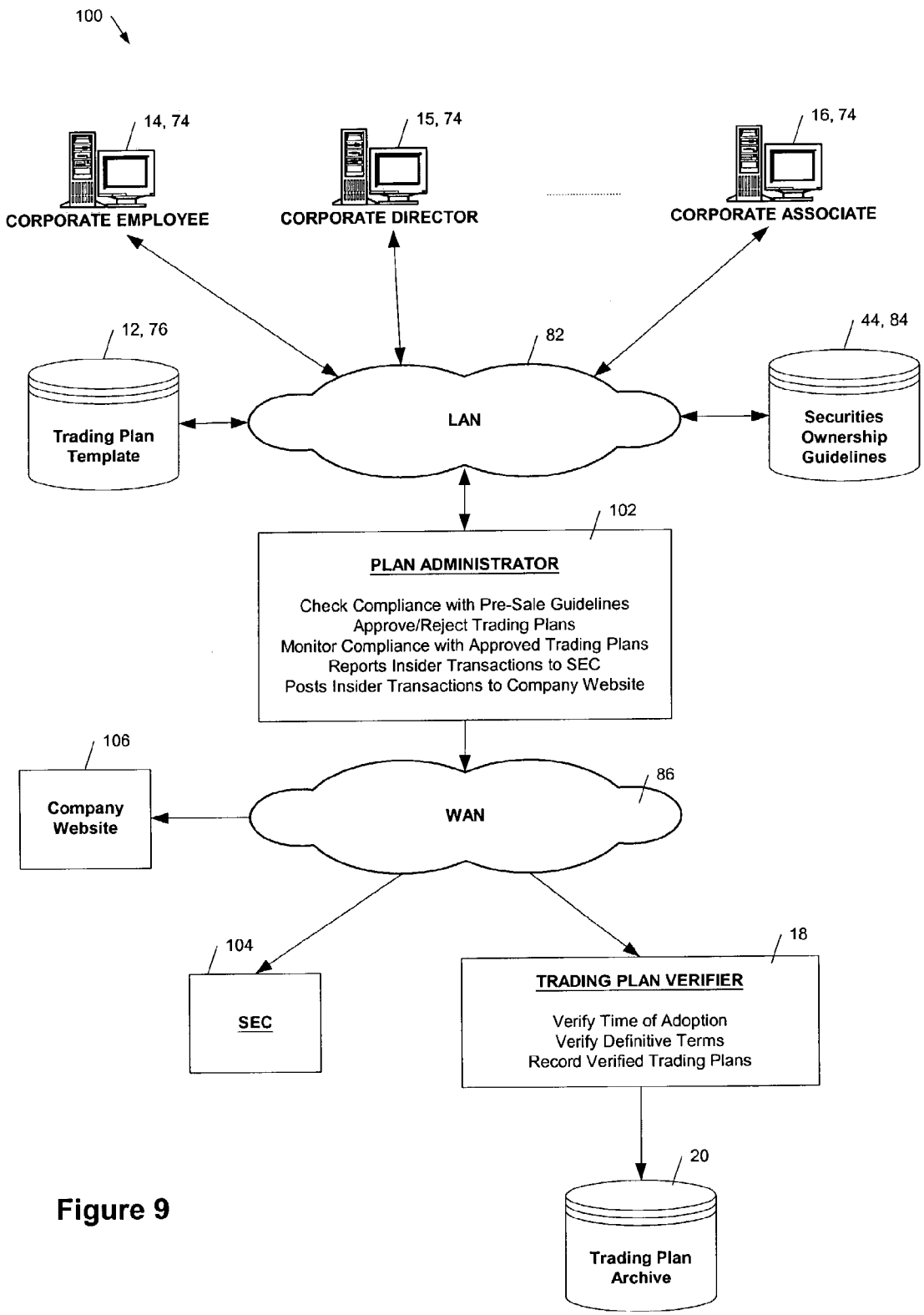
FIG. 9 is a block diagram illustrating another example network-based system for handling securities trading plans.

FIG. 9 is a block diagram illustrating another example network-based system 100 for handling securities trading plans. This embodiment 100 is similar to the system of FIG. 7, except that the plan administrator 102 in this embodiment 100 is configured to report insider transactions to the SEC 104 and to post insider transactions to a company website 106, in accordance with Section 16 of the Securities Exchange Act of 1934 ("Section 16"). Section 16 requires that certain transactions in company securities by corporate associates be reported to the SEC and posted on the company's Internet website. Accordingly, a software-based plan administrator 102 may be configured to satisfy the requirements of Section 16 automatically by posting completed insider transactions to a company website and reporting the transactions using electronic filing software available through the SEC website.

FIG. 10 shows an example trading plan template 110 for the sale of owned shares of common stock. This example trading plan template 110 is an electronic document that is preferably available to corporate associates 14–16 via a corporate LAN, and may be used as the trading plan template 12, described above. The trading plan template 110 may be hyperlinked 112 to a set of general instructions (see FIG. 12) that can be referred to by a corporate associate 14–16 while completing the template 110.

As illustrated in question numbers three (3) through nine (9), the trading plan template 110 should include sufficient detail of the planned stock transaction(s) to ensure compliance with the relevant federal securities laws, such as Rule 10b5-1. In addition, the illustrated trading plan template 110 confirms that the corporate associate 14–16 is not aware of any material nonpublic information at the time the plan is completed (question no. 2) and that the corporate associate has read and understood the general instructions 112 (question no. 11). The template 110 also enables the corporate associate 14–16 to view the proposed transactions on a calendar prior to submitting the completed trading plan 110 by selecting a submit icon 114.

FIGS. 11A and 11B show an example trading plan template 120 for the sale of option shares of common stock. The electronic trading plan template 120 is similar to the trading plan template 110 shown in FIG. 10, except that this embodiment 120 is especially configured to detail the future sale of common stock acquired through the exercise of stock options (see e.g., questions 3–10).

Figure 12:
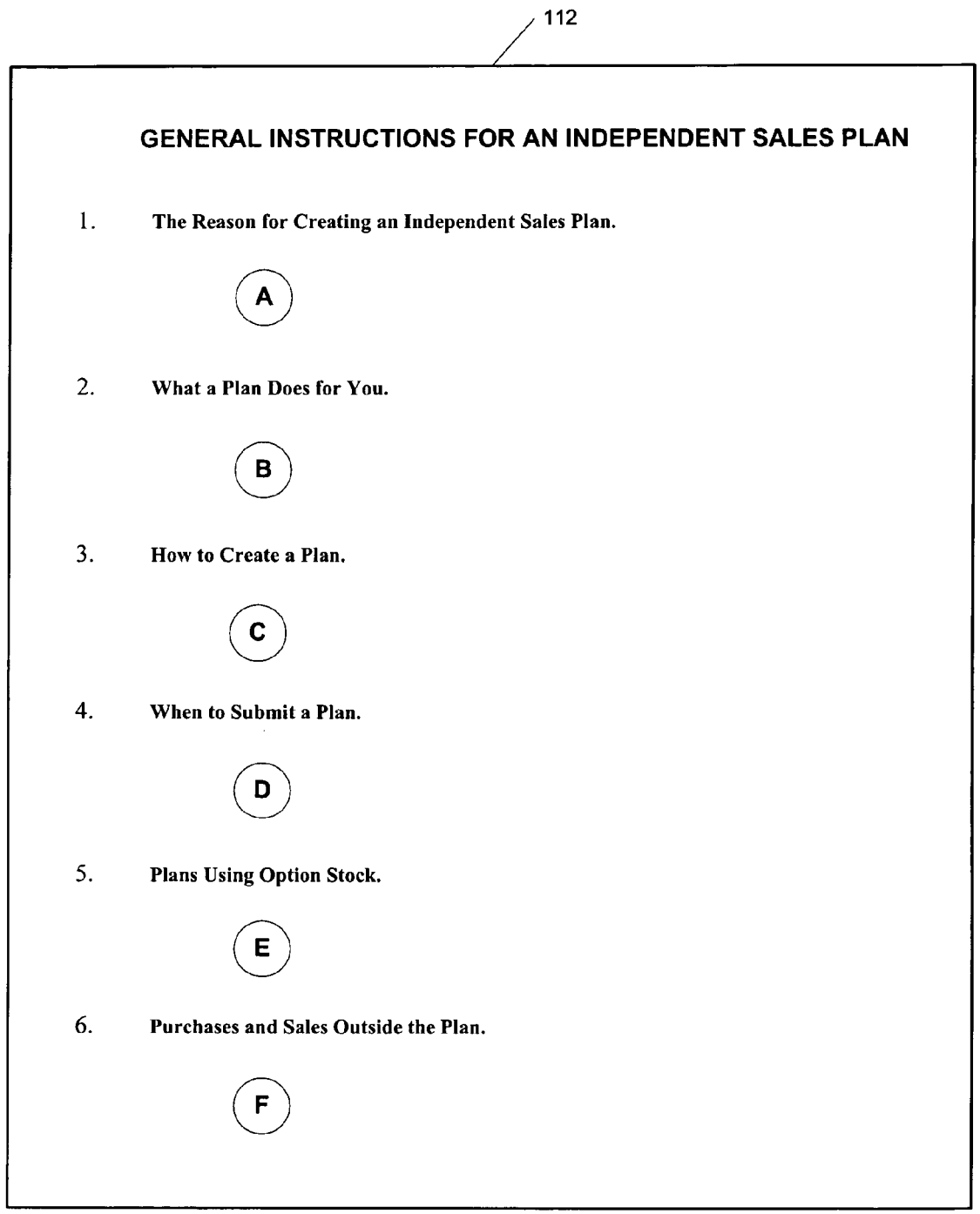
FIG. 12 shows an example set of general instructions for use with the example trading plan templates of FIGS. 10 and 11.

FIG. 12 shows an example set of general instructions 112 for use with the example trading plan templates of FIGS. 10 and 11. The illustrated example general instructions 112 include six headings, labeled 1–6. Textual instructions may be inserted at references A–F. At reference A, general instructions may, for example, be included under the heading "The Reason for Creating an Independent Sales Plan," as follows:

As you know from the XYZ Company Insider Trading Policy, you can be at risk for civil and criminal penalties if you trade company securities while in possession of material nonpublic information, which is commonly referred to as "inside information." Since inside information can come into existence at any time, it can be difficult for you to schedule a sales plan to meet your personal financial objectives because you have to avoid periods in which you may have this kind of information. You can address this problem by using an Independent Sales Plan (ISP), submitted at a time when you are not aware of inside information, to schedule your trades ahead of time.

At reference B, general instructions may, for example, be included under the heading "What a Plan Does for You," as follows:

A rule under the US federal securities laws provides that you will not be liable for trading on the basis of inside information if you adopt a written plan for trading securities when you are not aware of any inside information and follow it exactly. This federal law is referred to as "Rule 10b-5." Sometimes this kind of selling program is called a "Rule 10b-5 plan." If you properly adopt an ISP, a record of it will be maintained for at least 2 years after your last scheduled sale. If you are questioned and should need to prove that your sales were made pursuant to your ISP, a copy of your ISP will be made available upon your request, together with confirmation of the date and time when you submitted it.

At reference C, general instructions may, for example, be included under the heading "How to Create a Plan," as follows:

You should begin by consulting your own personal advisors about your financial objectives and how sales of XYZ Company stock can help you meet them. Then you can create an Independent Sales Plan by responding to the questions presented in the ISP Template. Next, review the resulting transaction calendar and make sure it reflects the sales you want to make. When you are ready, submit the completed plan for approval by the Plan Administrator.

At reference D, general instructions may, for example, be included under the heading "When to Submit a Plan," as follows:

You can submit an ISP at any time when the trading window established under the Securities Ownership Guidelines is open and you are not aware of any material nonpublic information. You can fill out the ISP Template and save it outside the window period, but it will not be accepted if you try to submit it before the window period opens. You should receive an e-mail confirming or rejecting your proposed ISP within 10 days after you properly submit it.

At reference E, general instructions may, for example, be included under the heading "Plans Using Option Stock," as follows:

In addition to selling stock you already own, you can use an ISP to schedule the exercise of your XYZ Company stock options accompanied by sale of some or all of the shares covered by the option. Of course, the options have to be vested to the extent of the shares you plan to sell before the sale date. If you want to sell some option stock and some stock you already own, you will need to submit two separate plans. This is the only scenario in which you can have more than one ISP in effect at the same time.

At reference F, general instructions may, for example, be included under the heading "Purchases and Sales Outside the Plan," as follows:

You should not assume that you will be free to buy and sell XYZ Company stock outside your ISP while it is in effect. If you choose to do so, or to enter into any sort of hedging arrangement, it may void the protection offered by your ISP. For more information about transactions outside the ISP, or on any related topic. please contact the Plan Administrator.

It should be understood, however, that the general instructions 112, along with the example trading plan templates 110, 120 illustrated in FIGS. 10 and 11, are provided for illustrative purposes only. Other trading plan templates that satisfy the requirements of the applicable federal securities laws, such as Rule 10b5-1, could also be used.

This written description uses examples to disclose the invention, including the best mode, and also to enable a person skilled in the art to make and use the invention. The patentable scope of the invention may include other examples that occur to those skilled in the art.

It is claimed:

1. A system for handling securities trading plans, comprising:
a storage mechanism maintained by an organizational entity,
the storage mechanism storing a securities trading plan template that is to be accessed by a person associated with the organizational entity to generate a completed securities trading plan identifying conditions under which a securities-related transaction is to occur; and
a processor executing a plan verifier program that is accessible via a computer under the control of the organizational entity and that receives the completed securities trading plan and records the completed securities trading plan in the storage mechanism, the storage mechanism providing secure storage of the securities trading plan to ensure that the recorded securities trading plan provides proof of a time of adoption of the securities trading plan and definitive terms of the securities trading plan for use as a defense in a securities-related legal proceeding involving the person associated with the corporate entity;

wherein the securities trading plan is completed by the person associated with the organizational entity at a time when the person is not aware of material, non-public information relating to the organizational entity in order to minimize exposure to liability under federal securities laws in the event that the person becomes aware of such material, non-public information after the completed securities trading plan has been recorded by the plan verifier;

wherein the plan verifier program and the control provided by the organizational entity enable the securities trading plan to be recorded without requiring assistance of an attorney or a broker.

2. The system of claim 1, further comprising a plan administrator that determines if the completed securities trading plan complies with a set of securities ownership guidelines.

3. The system of claim 2, wherein the plan administrator is a software application executing on a computer network.

4. The system of claim 1, wherein the securities trading plan template is accessed by the person associated with the organizational entity through a computer network.

5. The system of claim 3, wherein the plan verifier is a software application executing on the computer network.

6. The system of claim 5, wherein the storage mechanism is a database coupled to the computer network.

7. The system of claim 1, wherein the storage mechanism is a filing cabinet.

8. The system of claim 1, wherein the plan verifier certifies a date on which the completed securities trading plan was generated.

9. The system of claim 1, wherein the plan verifier certifies the conditions under which the securities-related transaction is to occur.

10. The system of claim 1, wherein the plan verifier operates independently of the organizational entity.

11. The system of claim 1, wherein the securities trading plan template follows a standard format.

12. The system of claim 1, wherein the defense uses the recorded securities trading plan as a Rule 10b5-1 defense in the securities-related lawsuit.

13. The system of claim 1, wherein the conditions under which the securities-related transaction is to occur specify an amount of securities to be purchased or sold, a price at which the securities are to be purchased or sold, and a date on which the securities are to be purchased or sold.

14. The system of claim 1, wherein the conditions under which the securities-related transaction is to occur include a means for determining an amount of securities to be purchased or sold, a price at which the securities are to be purchased or sold, and a date on which the securities are to be purchased or sold.

15. The system of claim 1, wherein the conditions under which the securities-related transaction is to occur do not permit the person associated with the corporate entity to exercise any subsequent influence over how, when, or whether to effect a purchase or sale under the securities-related transaction.

16. The system of claim 14, wherein the determining means is a written formula.

17. The system of claim 14, wherein the determining means is a computer program.

18. The system of claim 1, further comprising a predictor module that monitors recorded securities trading plans and that analyzes the completed securities trading plan and other related trading plans recorded in the storage mechanism to predict an effect on a market condition related to a type of security identified in the recorded trading plans.

19. The system of claim 1, whereby the plan verifier program alleviates a need for the person associated with the organizational entity to utilize a third party financial entity to prepare or record the completed securities trading plan.

20. The system of claim 1, wherein the computer is a server maintained by the organizational entity.

21. The system of claim 1, wherein the storage mechanism is located on a server under the control of the organizational entity or on a server owned and operated by the organizational entity.

22. A computer implemented method of handling securities trading plans within an organization entity, comprising the steps of:

receiving from a corporate associate a computer implemented securities trading plan that identifies conditions under which a securities-related transaction is to occur;

determining if the securities trading plan complies with a set of securities ownership guidelines; and if the securities trading plan complies with the set of securities ownership guidelines, then recording the securities trading plan in a storage mechanism maintained by the organizational entity, the storage mechanism providing secure storage of the securities trading plan to ensure that the recorded securities trading plan provides proof of a time of adoption of the securities trading plan and definitive terms of the securities trading plan for use by the corporate associate as a defense in a securities-related legal proceeding involving the corporate associate;

wherein securities trading plan is completed by the corporate associate at a time when the corporate associate is not aware of material, non-public information relating to the organizational entity in order to minimize exposure to liability under federal securities laws in the event that the corporate associate becomes aware of such material, non-public information after the completed securities trading plan has been recorded;

wherein the plan verifier program and the control provided by the organizational entity enable the securities trading plan to be recorded without requiring assistance of an attorney or a broker.

23. The method of claim 22, wherein the defense uses the recorded securities trading plan as a Rule 10b5-1 defense in the securities-related lawsuit.

24. The method of claim 22, comprising the further step of submitting the securities trading plan to a plan verifier.

25. The method of claim 22, wherein the conditions under which the securities-related transaction is to occur specify an amount of securities to be purchased or sold, a price at which the securities are to be purchased or sold, and a date on which the securities are to be purchased or sold.

26. The method of claim 22, wherein the conditions under which the securities-related transaction is to occur include a means for determining an amount of securities to be purchased or sold, a price at which the securities are to be purchased or sold, and a date on which the securities are to be purchased or sold.

27. The method of claim 26, wherein the determining means is a computer program.

28. The method of claim 22, wherein the conditions under which the securities-related transaction is to occur do not permit the employee to exercise any subsequent influence over how, when, or whether to effect a purchase or sale under the securities-related transaction.

29. The method of claim 22, wherein if the securities trading plan complies with the set of securities ownership guidelines, then purchasing or selling securities in accordance with the securities trading plan.

30. The method of claim 29, wherein the securities are purchased or sold by a plan administrator within the organization entity.

31. The method of claim 29, wherein the securities are purchased or sold by the corporate associate.

32. The method of claim 29, wherein the securities are purchased or sold by a securities broker on behalf of the corporate associate.

33. The method of claim 22, wherein a plan administrator monitors compliance with the securities trading plan.

34. The method of claim 22, wherein a third-party verifying agent monitors compliance with the securities trading plan.

* * * * *